United States Patent [19]

Breyer

[11] Patent Number: 4,916,825

[45] Date of Patent: Apr. 17, 1990

[54] WORK-CONTACTING PROBE SYSTEM FOR A COORDINATE-MEASURING INSTRUMENT

[75] Inventor: Karl-Hermann Breyer, Heidenheim, Fed. Rep. of Germany

[73] Assignee: Carl-Zeiss-Stittung, Heidenheim/Brenz, Fed. Rep. of Germany

[21] Appl. No.: 234,510

[22] Filed: Aug. 22, 1988

[30] Foreign Application Priority Data

Aug. 27, 1987 [DE] Fed. Rep. of Germany ....... 3728578

[51] Int. Cl.[4] .............................................. G01B 7/28
[52] U.S. Cl. ...................................... 33/561; 33/559; 33/556
[58] Field of Search ................. 33/556, 557, 558, 559, 33/560, 561, 572, 832, 501, 503

[56] References Cited

U.S. PATENT DOCUMENTS

| | | | |
|---|---|---|---|
| 3,209,460 | 10/1965 | Eisele | 33/556 |
| 4,549,356 | 10/1985 | Ernst | 33/556 |
| 4,637,119 | 1/1987 | Schneider et al. | 33/561 |
| 4,713,892 | 12/1987 | Strauss | 33/556 |
| 4,716,657 | 1/1988 | Collingwood | 33/561 |
| 4,738,033 | 4/1988 | Ferber et al. | 33/559 |
| 4,784,539 | 11/1988 | Lehmkuhl | 33/558 |
| 4,785,545 | 11/1988 | Aubele | 33/557 |
| 4,815,214 | 3/1989 | Enderle et al. | 33/561 |

FOREIGN PATENT DOCUMENTS 2136573 9/1984 United Kingdom ................. 33/503

Primary Examiner—William A. Cuchlinski, Jr.
Assistant Examiner—Thomas B. Will
Attorney, Agent, or Firm—Hopgood, Calimafde, Kalil, Blaustein & Judlowe

[57] ABSTRACT

A work-contacting probe system is selectively operable as a single-stage or as a two-stage system. The system consists of a first central probe head of large diameter and of one or more small or auxiliary probe heads of dimensions which are reduced as compared with the first probe head. The small probe head can be selectively accommodated, in substitution of a rigid probe pin on the probe-chucking receptacle of the central probe head. Upon substitution of the auxiliary probe-head system for a rigid probe pin, associated electronic circuitry automatically responds to the fact of substitution, (1) by substantially increasing spring-preload force on the probe-chucking receptacle of the central probe head, thereby converting the central probe head for collision-detection service, while (2) connecting work-contacting signals from the auxiliary probe-head system for exclusive service of measurement functions.

13 Claims, 4 Drawing Sheets

WORK-CONTACTING PROBE SYSTEM FOR A COORDINATE-MEASURING INSTRUMENT

BACKGROUND OF THE INVENTION

The present invention relates to a work-contacting probe system for a coordinate-measuring instrument, wherein a probe head supplies a work-contact signal and has a chuck for removable attachment of a selected one of a plurality of probe pins.

Probe heads of the switching type supply an output signal pulse at the instant when the shaped contact element of the probe pin of the probe head contacts the workpiece to be measured. A probe head of this type is illustratively described in U.S. Pat. No. 4,177,568. To increase the accuracy of workpiece-contact recognition, this known probe head has a piezoelectric sensor which is sensitive to very small contact force and thus responds to initial contact with the workpiece, by supplying a signal to retain the instantaneous measurement values of the instrument, namely, as instantaneously read from the measurement scales of the coordinate-measuring instrument. A second signal pulse is produced when the movable probe-pin holder moves out of its position of rest in the further course of the contacting movement. This second pulse serves to verify the first contact pulse and to discriminate from such irrelevant pulses as may be caused by machine vibrations.

Use of an adapter enables different probe-pin combinations to be selectively mounted to the movable chuck of this known probe head, illustratively as described in U.S. Pat. No. 4,637,119, as well as in the present Assignee's Product Information Bulletin 60-20-027e, entitled "Probe Changing Systems" (Publication date III/85).

In spite of its versatility, this known probe system cannot satisfactorily solve all measurement tasks which are encountered in practice. For example, when a measurement task requires a very long or a very heavy probe-pin combination, a high starting or braking acceleration in the course of moving the probe head can momentarily dislodge the probe pin adapter from its seated (chucked) position, thus erroneously simulating a contacting process.

To handle measurement tasks which require large probepin lengths, it is known to provide, in place of a central switching-type probe head which can carry a selected one of various probe-pin combinations, a plurality of small switching probe heads, each of which has only a very short probe pin; in turn, each of the small switching probe heads is mounted to the coordinate-measuring instrument, via suitable distributor or extension means. Such a probe system is known, for example, from West German Patent Application No. P 36 34 689.6 or from the corresponding U.S. patent application Ser. No. 105,825 U.S. Pat. No. 4,785,545, as well as from applicant's Assignee's "Information Brochure" (60-25-004e), in connection with the "Microtecnic 86" Exposition in Zurich, Switzerland, Oct. 14 to 18, 1986. As can be noted from FIGS. 4 to 6 on Pages 12 and 13 of the said brochure, these small switching probe heads of smaller diameter are mounted on the coordinate-measuring instrument via a buckling (yieldable) point, for protection against collision damage. Collision protection is afforded by a collision-sensing switch which is connected to the control system of the coordinate-measuring instrument.

Such collision protection is, however, biased with relatively great spring force, as compared with bias of the probe-pin holder in a probe head of the first-mentioned type (e.g., as in U.S. Pat. No. 4,177,568). This is necessary in order to assure retention of the zero position of the currently mounted probe-head combination, with its relatively great mass, even if a relatively great rotational moment should act on the collision-protection device, as a result of an eccentric force application.

When a given system employs a large number of small switching probe heads, it becomes relatively expensive to provide collision protection for all heads, and the price of a thus-equipped coordinate-measuring instrument necessarily increases. Furthermore, a simple change between a single probe-head system and a multiple probe-head system is not possible since an entire multiple-head system, including all provision for its collision protection, must be removed if a single switching probe head is to be mounted in its place. Such conversions always mean subsequent recalibration of the involved probe system.

BRIEF STATEMENT OF THE INVENTION

It is the object of the present invention to provide an improved probe system of the first-mentioned type (i.e., a single probe head system) such that, at least expense, it is possible to accommodate even large probe-pin extensions and to operate with high speed.

The invention achieves this object (1) by providing an auxiliary switching-type probe head having reduced dimensions as compared with those of an installed single switching-type probe head, (2) by providing for the selective mounting of the auxiliary probe head to the probe-mounting system of the installed probe head, and (3) by providing for measuring-instrument reliance upon work-contact signals from the auxiliary probe head instead of those from the installed probe head, whenever the auxiliary probe head is thus mounted.

By these measures, advantages of the respective probe systems described in connection with the background of the invention are combined and, at the same time, a rapid change between the two systems is possible. Thus, for example, a switching centrally located probe head with which a large number of different measurement tasks can already be solved, can remain installed on the machine when changing to a system having a plurality of small switching probe heads and can provide for collision protection when equipped with an auxiliary probe head. The change to such a two-stage system can be easily effected without tedious work, in that, an existing probe-changing chucking adapter can be used to mount each auxiliary probe head, just as such an adapter is currently used to mount each one of a plurality of probe-pin configurations.

In furtherance of the foregoing, it is advantageous to integrate connecting contacts for the transmission of the work-contact signals from the auxiliary probe head into the mounting or chucking system in the installed probe head. These connecting contacts serve for transferring work-contacting signals from the auxiliary probe head to the measuring-machine cable system which already serves the installed probe head; and a profile or other recognition code may be a built-in feature of the connecting-contact system, whereby the computer of the measuring machine can automatically adapt its mode of operation to the operational parameters of a newly substituted auxiliary switching probe.

The installed central probe head is operated in conventional manner, with reliance upon its work-contact switching system, when installed with a rigid probe pin or probe-pin configuration. But upon substituting an auxiliary probe head and its probe pin or probe-pin configuration, the operational measuring mode of the instrument is automatically transferred to reliance upon the work-contact switching system of the auxiliary probe head. Also, upon substituting an auxiliary probe head for a rigid probe pin, a motor within the installed probe head is activated to reduce the switching sensitivity of the installed probe head, as by motor-driven preload of a spring-bias system, the reduction being to a level which will (1) allow all probe-derived work-contact signals to be recognized only via the switching means of the auxiliary probe head and which will (2) additionally provide a collision-protection feature for the auxiliary probe head. In the latter connection, i.e., when accommodating an auxiliary probe head, the switching-signal output of the installed probe head is advantageously forwarded to control means associated with the coordinate-measuring instrument for stopping the drive of the instrument in the event of a collision.

DETAILED DESCRIPTION OF A PREFERRED EMBODIMENT

The invention will be described in detail in conjunction with the accompanying drawings, in which.

Figure 1:
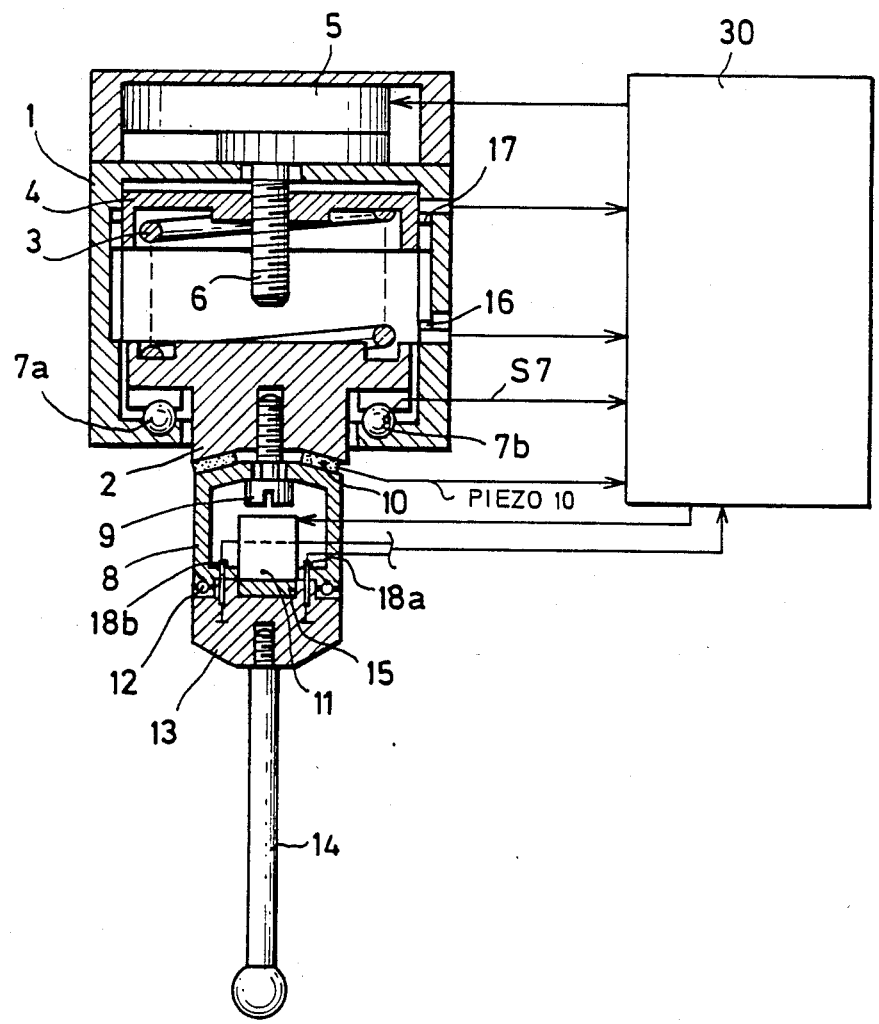
FIG. 1 is a simplified longitudinal section of a two-stage probe-head system of the invention, with a rigid probe pin in place.

In FIG. 1, the housing 1 of a central probe head will be understood to be mounted via suitable connecting elements (not shown), for example, to the movable spindle or crossarm of a coordinate-measuring instrument.

The housing 1 contains a three-point bearing for precise location of the at-rest position of the movable part 2 of the probe head; only two ball bearings 7a and 7b of this three-point bearing are shown, and the three bearing points will be understood to be equally spaced. The bearing balls and their seats form an electric switch which is closed only when movable part 2 is in its at-rest position; any break in an at-rest ball/seat engagement opens the switch and indicates a lifting of the movable part 2 out of its bearing. The electric connection to this switch is designated S7.

A spring 3 continuously urges the movable part 2 of the probe head toward seated relation with its bearing; and the compressional load of spring 3 on movable part 2 is adjustable via a motor 5 driving a spindle 6, which has threaded engagement to a seating plate 4 for the spring 3. Plate 4 is linearly guided in the housing 1, and the spindle-drive motor is mounted in the upper part of the housing.

Within housing 1, end limits of the region of spring (3) adjustment are marked by two microswitches 16 and 17, each of which is poised for actuation by plate 4.

A probe-receptacle 8 is mounted to the movable part 2 by attachment means, shown as a screw 9. A piezoelectric sensor 10 is interposed between the probe-pin receptacle 8 and the movable part 2, and the output signal of sensor 10 provides instant recognition of workpiece contact. Receptacle 8 contains an electromagnet 11 having a permanent-magnet core, forming a known chuck for interchangeable accommodation of a selected one of a plurality of probe pins. In FIG. 1, this known chucking device has magnetically reacted with a ferromagnetic-core part 15 of the mounting adapter 13 of a rigid probe pin 14, the reaction being that of magnetically drawing adapter 13 into position-locating engagement with three-point bearing means 12 at the bottom end of the probe-pin receptacle 8; reference is made to U.S. Pat. No. 4,637,119 for a more complete description of such magnetic-chucking means.

The probe-pin receptacle 8 is further shown with plural contact pins, as at 18a, and 18b to serve a function which will be described in connection with FIG. 2. When a rigid probe is introduced, as at 14 in FIG. 1, these contact pins 18a and 18b are connected to ground.

Figure 2:
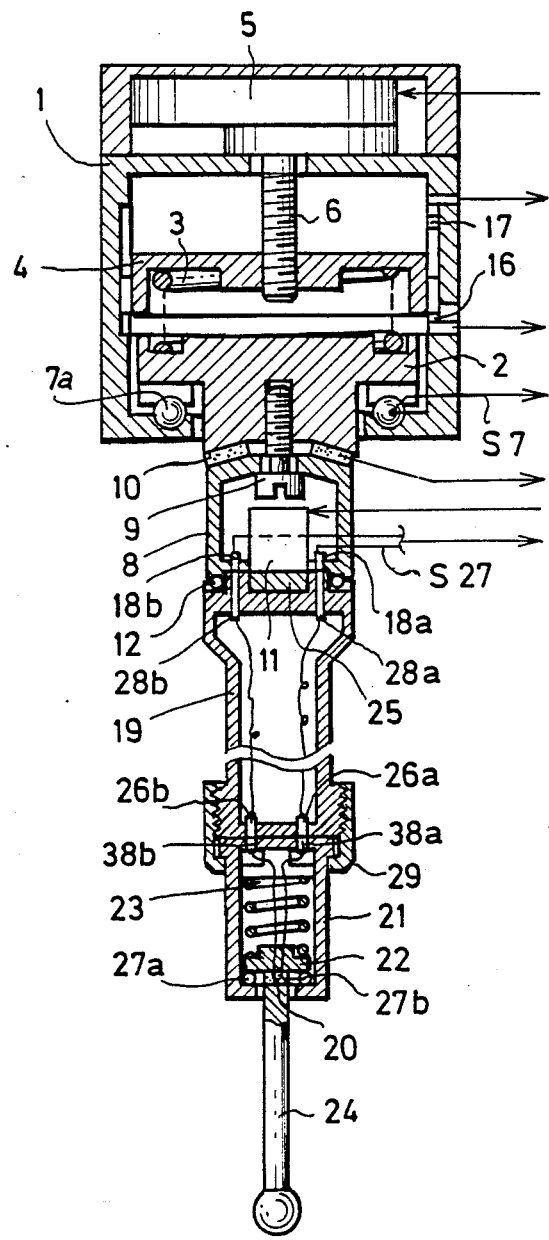
FIG. 2 is a similar view of the two-stage probe system of FIG. 1, with an auxiliary switching probe head substituted for the rigid probe pin of FIG. 1.

In FIG. 2, a complete "small" switching probe head 21 is shown mounted, via an intermediate or extension member 19, to adapter 8 and its chucking means 11, in substitution for the rigid probe pin 14 of FIG. 1. Probe head 21 is of much smaller diameter than the probe head of FIG. 1 but has, in principle, the same construction as the probe head of FIG. 1. It has a movably mounted part 22 which is urged via a spring 23 against a three-point bearing which determines its zero or at-rest In this case also, the bearing balls 27(a, b) form a tilt-sensitive electric switch circuit. A probe pin 24 mounted to probe head 21 is connected to the movable part 22 via an interposed second piezoelectric sensor 20.

The probe head 21 is secured to the outer end of extension member 19, via threads of a cap nut 29. The other end of member 19 is provided with a ferromagnetic insert 25 and is held by magnet 11 of receptacle 8 of the central probe head 1, against bearing 12 of the probe-change device.

At its respective ends, extension member 19 has internally connected contacts 28 (a, b) and 26 (a, b) which conduct work-contact signals from probe pin 24 to mating contacts 18 (a, b) in the receptacle 8 of probe head 1.

In the showing of FIG. 1, spring 3 is in its partially relaxed condition and exerts only a slight force, for example 0.2 N, on part 2 of the probe-pin receptacle. In this spring position, probe head 1 acts in traditional manner as a switching probe head, the spring force being set to determine contact force exerted by probe pin 14 on the workpiece to be measured.

On the other hand, with the auxiliary switching probe head 21 inserted as shown in FIG. 2, the spring 3 in probe head 1 is more strongly compressed; illustratively, part 2 of the receptacle 8 will be loaded with a force of about 50N into seated relation on its bearing 7. In this adjusted condition, probe head 1 will be understood to serve only the function of collision protection, i.e., part 2 disengages from the bearing when auxiliary probe head 21 or its extension member 19 is unintentionally driven against an obstacle. And work-contact signals and functions, for the adjusted situation of FIG. 2 derive only from probe pin 24 of the "small" auxiliary probe head 21.

Figure 3:
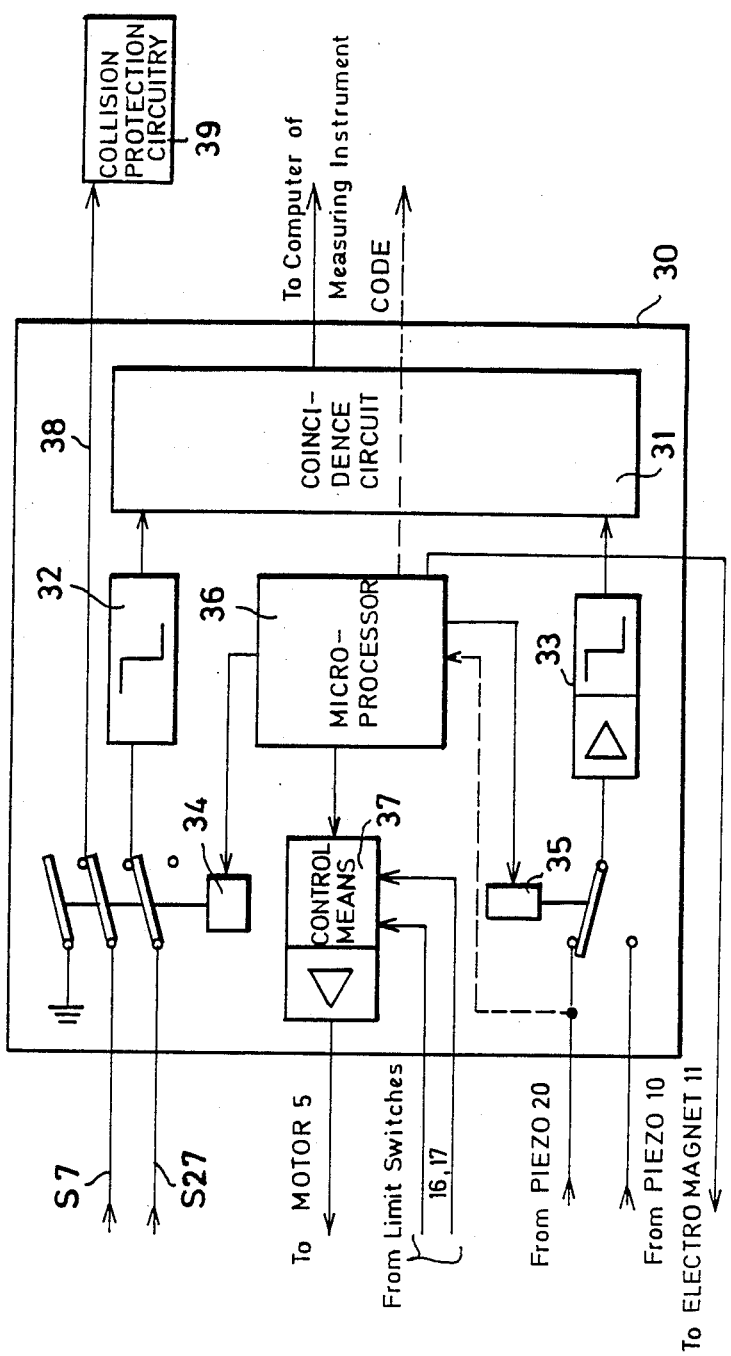
FIG. 3 is a block diagram of an electronic system adapted for selective use with the two-stage probe system of FIG. 1 and/or FIG. 2.

Necessary switching, as between the operational mode of FIG. 1 and the operational mode of FIG. 2, is effected by means of an electronic arrangement 30, having cable connections to the spring-adjusting motor 5, to the end-position limit switches 16 and 17 of loading the switching bearing 7, to the probe-change magnet 11, to the piezoelectric elements 10, 20, and to the contact pins 18 (a, b). The arrangement 30 is shown in FIG. 3 and will be described in connection with an overall operation of the probe system.

Arrangement 30 is seen to include control means 37 for reversible drive of motor 5 in probe head 1. Motor control means 37 is connected to a microprocessor system 36 and receives from the latter control signals for the adjusting of the compressional force of spring 3; the motor-control means 37 is further connected to the end-position limit switches 16 and 17 which report attainment of the respective limits of displacement for compressional adjustment of the spring.

Microprocessor 36 also controls separate relays 34 and 35 for switching of work-contact probe signals, as between reliance on a first-mounted pin 14 (FIG. 1) and reliance on a second-mounted pin 24 (FIG. 2). Relay 35 selectively connects the piezoelectric sensor 20 (of probe head 21) or the piezoelectric sensor 10 (of probe head 1) to the input of an amplifier and pulse-former stage 33. In the FIG. 1 mode of operation, relay 34 connects switch S7 of the bearing in probe head 1 to the input of a trigger stage 32; and, upon switching into the FIG. 2 mode of operation, relay 34 connects switch circuit S7 to collision-protection circuitry 39 of the coordinate-measuring instrument.

At the same time, circuit S27, which serves the switching bearing of auxiliary probe head 21, is connected to the input of a trigger circuit 32. The outputs of the circuits 33 and 32 are combined in a coincidence circuit 31, from which the actual work-contacting pulse sequence is forwarded as output to the computer of the coordinate-measuring instrument. Circuitry operating from such an output is known per se and is already part of the electronics of the probe head referenced as part of the background of the invention.

Control of the switching process, upon mode change (as between FIG. 1 and FIG. 2), can either be effected by the coordinate-measuring instrument via a connection (not shown) to microprocessor 36, or it can be initiated by the microprocessor itself, if provision is made for recognizing the newly changed and magnetically chucked structure. In FIG. 3, a cable connection (shown by dashed line) between piezoelectric sensor 20 and the microprocessor 36 suggests provision for such recognition, it being recalled that in the FIG. 1 mode, contacts 18 (a, b) of the base 13 of rigid probe 14 are shorted to ground, whereas in the FIG. 2 mode, contacts 18 (a, b) serve for transmission of work-contact signals; thus, it can be determined, as by microprocessor interrogation of the internal resistance of circuit S27, whether a rigid probe 14 or a small auxiliary switching probe head 21 has been mounted to receptacle 8.

FIG. 3 also suggests, by means of another dashed line output (labeled "CODE") from the microprocessor, that coding appropriate to the particular currently installed probe-pin or probe-head combination, as detected at the receptacle mounting of the particular combination, may be another data output to the computer of the coordinate-measuring machine.

Figure 2A:
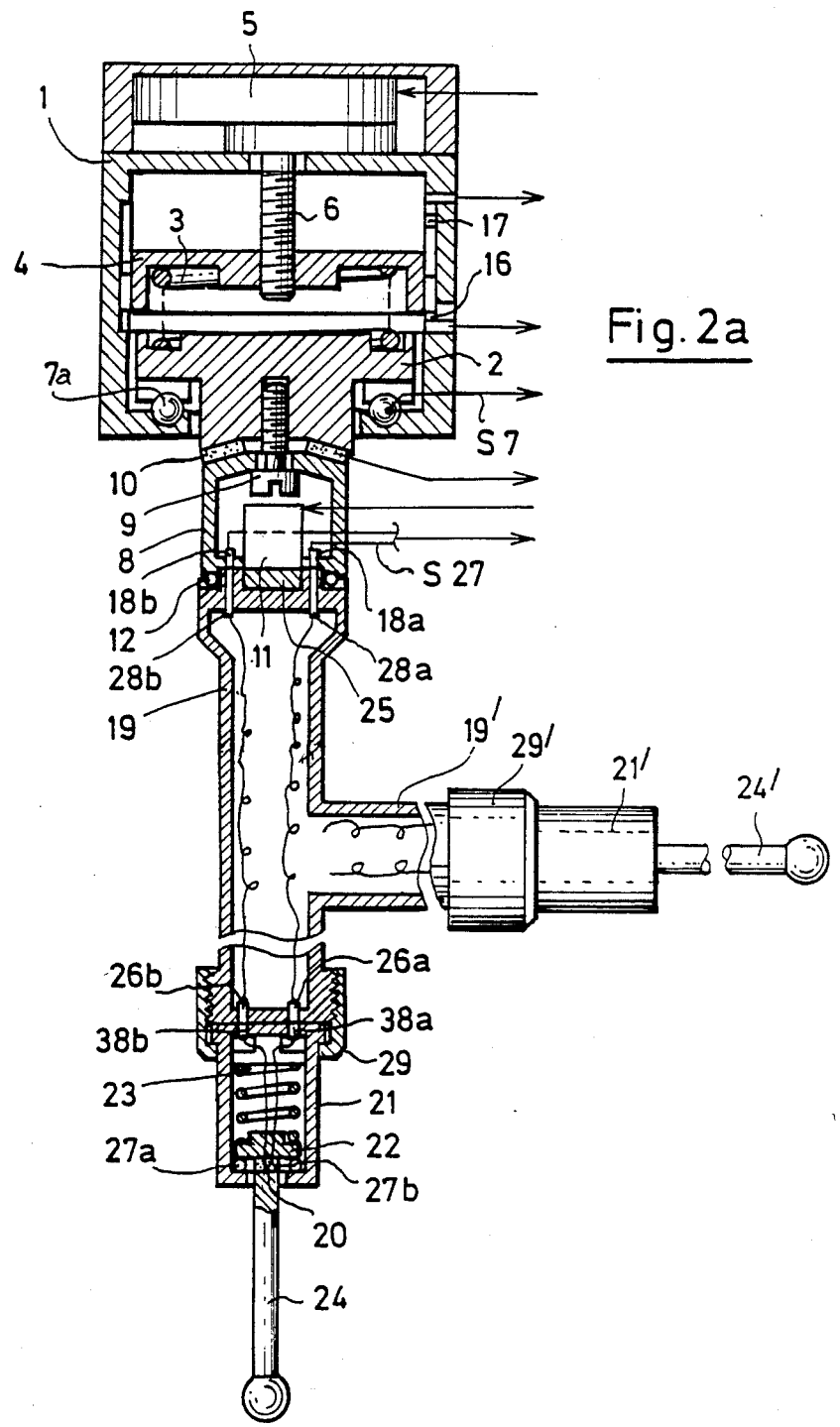
FIG. 2a is a view similar to FIG. 2 to show a modification.

Although FIG. 2 shows only a single "small" switching probe head 21 connected to the central probe head 1 via the extension member 19, it is clear that a plurality of small probe heads can interchangeably be chucked to probe head 1, when the connecting piece (19) is developed suitably as a multiple-arm distributor, reference being had to the disclosure of said pending U.S. application Ser. No. 105,825. Such an arrangement is specifically suggested by FIG. 2a, wherein a second auxiliary probe head 21' (with a work-contacting probe pin 24') is attached by means 29' to a transverse arm 19' of extension member 19, it being understood that contact-pin and electronic provision (not shown) is available to accommodate electrical-signal output of this second auxiliary probe head 21'.

Furthermore, instead of the central switching probe head 1, the invention will be understood to be applicable to use of a probe head of the measuring type, or to use of universal probe head which can be optionally switched between two modes of operation, namely:

a: use for obtaining of the probe signal, and
b: use for collision protection, when a second probe head has been attached. Finally, in reversal of this concept, it is also possible to attach a small measuring probe head to a central switching probe head.

What is claimed is:

1. In a probe system for a coordinate-measuring instrument wherein a probe head includes (1) a receptacle for interchangeable installation of a selected one of a plurality of rigid probe pins with (2) first probe means producing a first electrical signal in response to a condition of workpiece contact via an installed one of said probe pins, the improvement wherein an auxiliary probe head is provided for optional use in the system said auxiliary probe head being adapted for selective installation to said receptacle with said first probe means and having second probe means producing a second electrical signal in response to a condition of workpiece contact, and associated electronics for delivering probe-signal outputs to said instrument, said electronics including switching means operative (a) in a first mode to deliver said first electrical signal as its work-contact output as long as said receptacle accommodates one of said rigid probe pins, and (b) in a second mode to deliver said second electrical signal as its work-contact output as long as said receptacle accommodates said auxiliary probe head.

2. The probe system of claim 1, wherein said first-mentioned probe head comprises a housing adapted for mounting to the coordinate-measuring instrument, said receptacle being movably supported by said housing, bearings in said housing for determining a precisely seated position of limiting movement of said receptacle with respect to said housing, force-applying means within said housing and continuously urging said receptacle toward said seated location, said force-applying means being selectively controllable to exert a lesser or a greater application of force, said associated electronics responding in said first mode to control said force-applying means for said lesser force application, and said associated electronics responding in said second mode to control said force-applying means for said greater force application.

3. The probe system of claim 2, wherein (a) the coordinate-measuring instrument includes collision-protection circuitry, (b) a piezo-electric device associated with said first probe means produces a measurement-marking part of said first electrical signal, and (c) wherein said bearings form an electrical switch for producing a switch-signal part of said first electrical signal, said switch being closed when said receptacle is in said seated position and said switch being open upon loss of seated position at any of said bearings, said electronics responding in said first mode to cause the switch-signal part to verify the measurement marking part of said first electrical signal, and said electronics responding in said second mode to feed said switch signal to said collision-protection circuitry.

4. The probe system of claim 1, wherein both probe heads are of the switching type and each of them contains a contact-responsive sensor and a deflection-responsive electrical switch.

5. The probe system of claim 1, wherein said receptacle includes electrically operated chucking means for chucked retention of an installed probe pin or auxiliary probe head, and wherein said receptacle further includes contacts for outputting transfer of said second electrical signal to the exclusion of said first electrical signal.

6. The probe system of claim 1, wherein said associated electronics includes switch-operating means- so responsive to a mounting to said receptacle as to recognize whether the mounting involves a first-mode or a second-mode operation.

7. The probe system of claim 1, wherein said auxiliary probe head is mounted to one end of an extension member, and the other end of said extension member is adapted for selective mounting to said receptacle.

8. The probe system of claim 7, wherein said extension member comprises separate means for mounting each of a plurality of auxiliary probe heads.

9. The probe system of claim 1, wherein spring means within said first-mentioned probe head continuously loads said receptacle to an at-rest position of three point stabilized contact completion of an electrical-switch circuit, motor-driven means for varying the spring-loading force in the direction of said at-rest position, said electronics being connected to drive said motor-driven means to a lesser load setting when in said first mode and to a greater load setting when in said second mode.

10. The probe system of claim 9, in which said system further includes collision-protection circuitry, said switching means being operative in said second mode to connect said first electrical signal to said collision-protective circuitry.

11. The probe system of claim 2, in which said force-applying means comprises spring means, and motor-driven means contained within said housing for varying the force, of said spring means between said lesser and said greater force applications.

12. A method of operating a probe system for a coordinate-measuring instrument consisting of first and second probe heads having different dimensions, wherein the first probe head which has the smaller dimensions is mounted to a deflectable probe-pin receptacle of the second probe head having the larger dimensions; that probe signals of the smaller probe head are fed to the coordinate-measuring instrument instead of probe signals of the larger probe head as long as the smaller probe head is mounted; and that the deflectable receptacle of the larger probe head is subjected to increased loading in opposition to any deflection thereof as long as the smaller probe head is thus mounted.

13. A method according to claim 12, wherein the probe signals of the larger probe head are used for controlling a collision-protection circuit of the coordinate-measuring instrument, as long as the smaller probe head is mounted to said receptacle.

* * * * *